(No Model.)
R. O. RANDALL.
HORSE COLLAR PAD.
No. 483,016. Patented Sept. 20, 1892.
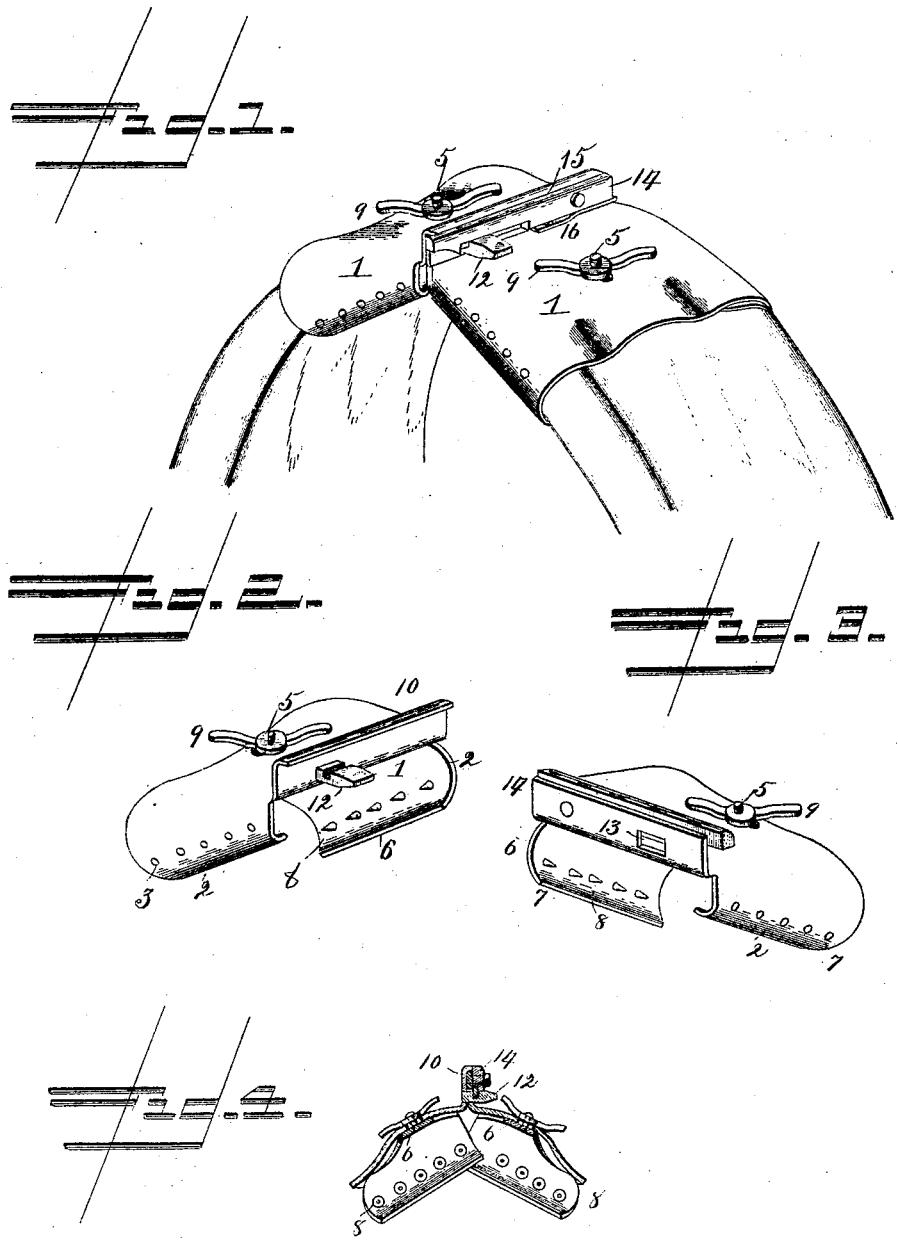
WITNESSES:
F. L. Ourand
W. L. Coombs
INVENTOR:
Robert O. Randall,
by Sims Bagger & Co
Attorneys

UNITED STATES PATENT OFFICE.

ROBERT O. RANDALL, OF JOPLIN, MISSOURI.

HORSE-COLLAR PAD.

SPECIFICATION forming part of Letters Patent No. 483,016, dated September 20, 1892.

Application filed May 4, 1892. Serial No. 431,779. (No model.)

*To all whom it may concern:*

Be it known that I, ROBERT O. RANDALL, a citizen of the United States, and a resident of Joplin, in the county of Jasper and State of Missouri, have invented certain new and useful Improvements in Horse-Collar Pads; and I do hereby declare that the following is a full, clear, and exact description of the invention, which will enable others skilled in the art to which it appertains to make and use the same, reference being had to the accompanying drawings, which form a part of this specification.

My invention relates to improvements in fasteners for horse-collars whereby the ends of same can readily be connected and disconnected.

The invention consists in the novel construction and combination of parts hereinafter fully described and claimed.

In the accompanying drawings, Figure 1 is a perspective view of a portion of a horse-collar with my invention applied thereto. Figs. 2 and 3 are views of the two parts comprising the fastener detached. Fig. 4 is a cross-section of the fastener.

In the drawings the reference-numeral 1 designates two metal plates curved or bent over at one side, as at 2, and provided with teeth 8, which project into the material of the collar. Each of these plates is formed at or near its center with a slot or aperture, through which passes a screw-threaded pin 5, secured to a laterally-movable plate 6, having its outer edge bent or curved, as seen at 7, and provided with teeth 8. It will be seen that the curved sides of the plates and curved movable plates form jaws between which the ends of the collar are clamped. A thumb-nut 9 is provided for the pin 5, by means of which the plates 6 are held in place. By unloosening this nut said plates may be adjusted so that the device may be used with different-sized collars. The inner edge of one of the plates 1 is bent upward, forming a flange 10, provided with a projecting hook or grooved arm 12, which is adapted to pass through a slot 13 in a corresponding flange 14 on the other plate. This flange 14 is also provided with a pivoted arm 15, the edge of which is adapted to engage in the groove in the arm or hook, and thus hold the plates securely. A spring 16 is secured to the plate underneath of arm 15, and its free end bears against said arm, thus insuring that it will engage with the hook or arm 12.

The operation will be readily understood. The jaws of the plates are engaged with the collar, and by means of their teeth they are securely held in place. When the ends of the collar are brought together and the hook 12 is passed through the slot 13, the arm 15 will engage with and securely hold the same. To disengage the same, the arm is disconnected from the hook, when the two plates can be readily separated.

By my invention the fastener, being on the outside of the collar, will not injure the horse's neck by chafing. In some of the horse-collars in use fasteners are on the inside of the collar and come in contact with the horse's neck. In hot weather they are liable to become heated, which will injure the animal. This is obviated by my invention, as will be readily understood by those skilled in the art.

Having thus described my invention, what I claim is—

A horse-collar fastener comprising the plates 1, having one side bent downwardly and inwardly, forming curved jaws, provided with teeth and with slots near their centers, the upwardly-projecting flanges at the inner ends of said plates, one of which is provided with a slot and a pivoted spring-actuated arm and the other with a hook adapted to be passed through said slot and engage with the spring-arms, the laterally-adjustable plates having one side or end bent downwardly and inwardly, and the screw-threaded pin and thumb-nut, substantially as described.

In testimony that I claim the foregoing as my own I have hereunto affixed my signature in presence of two witnesses.

ROBERT O. RANDALL.

Witnesses:
BOWMAN JARROTT,
MARION STAPLES.